United States Patent Office 2,808,410
Patented Oct. 1, 1957

2,808,410
RESERPONE AND PROCESS AND INTERMEDIATES FOR THE PREPARATION THEREOF

Harold B. MacPhillamy, Madison, N. J., assignor to Ciba Pharmaceutical Products, Inc., Summit, N. J., a corporation of New Jersey No Drawing. Application December 28, 1954,
Serial No. 478,185

8 Claims. (Cl. 260—286)

This invention relates to a new ketone to which I have assigned the name reserpone, and which I have reported in "Annals of the New York Academy of Sciences," vol. 59, pages 5 and 6 (1954). The invention also embraces the process for preparing reserpone from alcohol esters of reserpic acid p-toluene sulfonate such as alkyl reserpate p-toluene sulfonates, e. g. methyl reserpate p-toluene sulfonate.

It is known that reserpine, a sedative and hypotensive alkaloid can be hydrolyzed to yield reserpic acid. Reserpic acid can be converted into alcohol esters of reserpic acid p-toluene sulfonate, e. g. methyl reserpate p-toluene sulfonate according to copending application Serial No. 373,461, filed August 10, 1953, of E. Schlittler. These p-toluene sulfonates have the general formula:

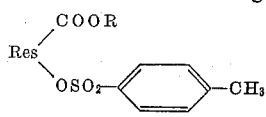

wherein R stands for the organic residue of an alcohol, such as alkyl, e. g. methyl and "Res" represents the divalent organic radical of the empirical formula $C_{21}H_{26}O_2N_2$, bound to the hydroxyl and carboxyl group in reserpic acid and having a basic tertiary nitrogen atom.

I have now found that by heating these alcohol esters of reserpic acid p-toluene sulfonate, preferably methyl reserpate p-toluene sulfonate, in collidine, the elements of p-toluene sulfonic acid are split off with formation of anhydroreserpates such as methyl anhydroreserpate, which by hydrolysis and decarboxylation with aqueous-ethanolic hydrochloric acid yields reserpone.

Thus the invention relates to the new compound reserpone, the above mentioned process for its preparation, and the intermediate anhydroserpates such as alkyl anhydroreserpates, e. g. methyl anhydroreserpate. It also embraces the salts of these compounds, for example with a hydrohalic acid, nitric acid, sulfuric acid, an alkane sulfonic or alkyl sulfuric acid or oxalic, tartaric, citric acid and the like, and furthermore the quaternary compounds thereof. The salts and quaternary compounds may be obtained from the tertiary bases in the customary manner, for example by treating them with the desired acids or the appropriate quaternizing agents.

Reserpone crystallizes from ethyl acetate and melts at 241–242°. It shows the optical rotation $$[\alpha]_D^{25} = -143 \pm 1°$$

(in chloroform). It analyzes for the empirical formula $C_{20}H_{24}N_2O_2$, and possesses a basic tertiary nitrogen atom, only one methoxyl group and one keto group, but no free or esterified carboxyl or hydroxyl group. Its infrared spectrum taken in a "Nujol" (mineral oil) mull shows the following bands which are given in reciprocal centimeters and grouped together according to their intensity: strong bands at 2287, 1704, 1468, 1275, 1159; medium-strong bands at 3388, 1347, 1038, 791; medium bands at 1633, 1436, 1370, 1324, 1311, 1250, 1231, 1192, 1114, 826; medium-weak bands at 1579, 1500, 1426, 1133, 774, 718, 705; weak bands at 2796, 2754, 1079, 1066, 1004, 961, 945, 926, 893, 850, 756, 743; shoulders at 1290, 1183.

Reserpone is useful for the prevention of sun-burn as an active ingredient in sun screens on account of its property to absorb ultraviolet light of wave length between 2,900 and 3,200 A. The ultra violet spectrum of reserpone taken in ethanol shows the following maximum in the above mentioned range: $\lambda = 2980$ A. ($\epsilon = 5900$). Reserpone is also a valuable intermediate for the synthesis of reserpic acid or its esters, such as methyl reserpate, reserpine, or O - (3,4 - dimethoxybenzoyl)-methyl reserpate or other analogous esters having sedative and hypotensive activity like reserpine, or other compounds with related structure.

The intermediate anhydroreserpates have similar valuable properties. Thus they can be used also as active ingredients of sun screens; the U. V. absorption spectrum of methyl anhydroreserpate for example, shows a maximum at 2980 A. ($\epsilon = 6582$). These anhydroreserpates are also valuable intermediates for the synthesis of reserpic acid or its above mentioned esters as well as other valuable compounds with related structure.

Methyl anhydroreserpate is characterized by the following data: it crystallizes from ethyl acetate and melts at 270–271° (dec.). It analyzes for the empirical formula $C_{23}H_{28}O_4N_2$ and contains a basic tertiary nitrogen atom, two methoxy groups and one carbomethoxy group. Suspended in "Nujol" (mineral oil) it shows the following bands in its infrared spectrum which are given in reciprocal centimeters and grouped together according to their intensity: strong bands at 3396, 2900, 1708, 1609, 1258, 1213, 1195, 1183, 1158; medium-strong bands at 1462, 1431, 1246, 1237, 1070, 828, 805; medium bands at 2809, 1630, 1574, 1497, 1372, 1358, 1345, 1309, 1294, 1281, 1114, 1090, 1051, 1032, 1006, 965. Medium-weak bands at 1328, 854, 780, 768; weak bands at 2716, 980, 949, 938, 908, 755, 726, 697, 657; shoulders at 1107, 1063. Reserpone and methyl anhydroreserpate can be represented respectively by the following most probable formulae:

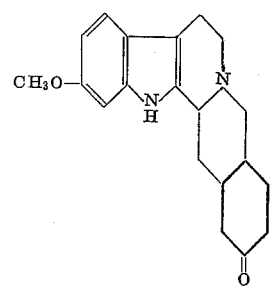

and

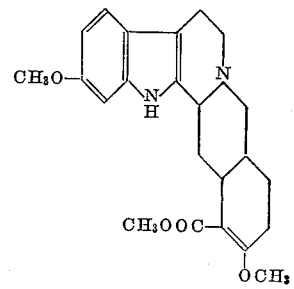

The new compounds, especially reserpone, can be made up into sun screen compositions according to the customary methods employed in making such preparations. Preferably they may be incorporated into a hydrophilic ointment which contains for example, glycols such as propylene glycol, higher aliphatic alcohols such as stearyl alcohol, white petrolatum, distilled water and the like. Such sun screen creams have preferably a content of 3–5 percent of the new active compounds.

The following example will serve to illustrate the invention, the relationship of parts by weight to parts by volume being the same as the gram to the milliliter.

*Example*

3.2 parts by weight of methyl reserpate p-toluene sulfonate are dissolved in 20 parts by volume of collidine and refluxed for two hours during which time a solid material precipitates. 50 parts by volume of water are then added to the cooled reaction mixture in small portions. After concentrating the mixture in vacuo, another 50 parts by volume of water are added and the mixture again concentrated in vacuo, whereby most of the collidine is removed. The solid residue is extracted with chloroform and the chloroform solution washed with diluted aqueous ammonia and water, dried over sodium sulfate and evaporated in vacuo. The amorphous residue which remains after evaporation is chromatographed on 30 parts by weight of alumina (activity I) with a mixture of acetone-benzene (6:4) as solvent. The fractions eluted with the above mixture of solvents are combined and evaporated and the residue crystallized from ethyl acetate. The thus obtained methyl anhydroreserpate melts at 270–271° and analyzes for the formula $C_{23}H_{28}O_4N_2$.

In the same manner, starting from the appropriate reserpate p-toluene sulfonates which can be obtained by reacting a reserpate possessing a free hydroxyl group with p-toluenesulfonyl chloride in pyridine, other anhydroreserpates can be prepared.

4.8 parts by weight of methyl anhydroreserpate are refluxed for three hours in a mixture of 60 parts by volume of ethanol and 300 parts by volume of 10 percent aqueous hydrochloric acid. The solution is concentrated to half its original volume, made basic with 20 percent aqueous sodium hydroxide and extracted with chloroform. The chloroform solution is evaporated to dryness after washing with water and drying over anhydrous sodium sulfate. The residue crystallizes on the addition of a few drops of methanol.

The thus obtained reserpone can be purified by chromatography on 100 parts by weight of alumina (acid washed, activity II to III) using benzene as a solvent and benzene-acetone (4:1) as eluting solvent. By crystallization of the fraction eluted with the benzene-acetone mixture reserpone is obtained melting at 241–242°; it analyzes for the empirical formula $C_{20}H_{24}N_2O_2$.

The melting points given herein above are in degrees centigrade.

What is claimed is:

1. A compound selected from the group consisting of reserpone and its acid addition salts.
2. Reserpone.
3. Acid addition salts of the compound of claim 1.
4. Lower alkyl anhydroreserpate.
5. Methyl anhydroreserpate.
6. Acid addition salts of the compounds of claim 4.
7. Process for the preparation of a new ketone which comprises heating an ester of reserpic acid p-toluene sulfonate in collidine thus splitting off the elements of p-toluene sulfonic acid so as to form the corresponding ester of anhydroreserpic acid and hydrolyzing and decarboxylating the ester by treating it with aqueous-ethanolic hydrochloric acid so as to form reserpone.
8. Process for the preparation of a new ketone which comprises hydrolyzing and decarboxylating an ester of anhydroreserpic acid by treating it with aqueous-ethanolic hydrochloric acid so as to form reserpone.

References Cited in the file of this patent

Furlenmeier et al.: Experientia, vol. 9, pp. 331–33 (Sept. 15, 1953).

Schlitter et al.: Annals of New York Acad. of Sci., vol. 59, article 1, pp. 1–7 (1954).